United States Patent [19]

Badger et al.

[11] 4,063,978

[45] Dec. 20, 1977

[54] BATTERY SEPARATOR ASSEMBLY MACHINE

[75] Inventors: John P. Badger, Genoa; Robert D. Simonton, Fremont, both of Ohio

[73] Assignee: Eltra Corporation, Toledo, Ohio

[21] Appl. No.: 475,480

[22] Filed: June 3, 1974

[51] Int. Cl.² ................ B32B 31/12; H01M 2/14
[52] U.S. Cl. ................ 156/82; 156/213; 156/216; 156/227; 156/256; 156/475; 156/499; 156/517
[58] Field of Search ........... 136/143, 131, 147, 132, 136/148, 145; 156/82, 196, 212, 213, 216, 217, 226, 227, 256, 475, 477 R, 484, 497, 499, 517, 556; 429/136, 139

[56] References Cited

U.S. PATENT DOCUMENTS

| | | | |
|---|---|---|---|
| 2,050,457 | 8/1936 | Ohlsen et al. | 156/484 |
| 2,055,508 | 9/1936 | Simon | 156/484 |
| 2,786,089 | 3/1937 | Pucher | 136/147 |
| 3,245,859 | 4/1966 | Busk | 156/216 |
| 3,413,175 | 11/1968 | Rochla | 156/499 |
| 3,461,017 | 8/1969 | Fecher et al. | 156/499 |
| 3,488,244 | 1/1970 | Lepisto | 156/497 |
| 3,514,331 | 5/1970 | Cupp et al. | 136/147 |
| 3,741,365 | 6/1973 | McAlpine et al. | 198/27 |
| 3,884,746 | 5/1975 | Loliger et al. | 156/499 |
| 3,892,620 | 7/1975 | Heussy | 156/499 |
| 3,900,341 | 8/1975 | Shoichiro et al. | 136/147 |

Primary Examiner—David A. Simmons
Attorney, Agent, or Firm—Owen, Purdue, Emch & Barker

[57] ABSTRACT

An apparatus and method for assembling a sheet of storage battery separator material about a lead battery plate is disclosed. A battery plate is fed against the center of a flat sheet of battery separator material. The sheet is retained by guides above and below the line against which the battery plate is fed, so that as the plate is fed past the guides, the sheet is folded and enveloped about the somewhat narrower battery plate. As the enveloped plate continues to advance forward, it is engaged between pairs of opposed belt conveyors which take the battery and separator through a heating station. The adjacent inner edge surfaces of the folded separator are heat-sensitive, so that when the hot air and combustion gases at the heating station strike the adjacent inner edge surfaces, they become tacky. The continuously advancing plate and separator is then moved by the belt conveyor through a pressing device wherein a pair of opposed pressing rollers at each lateral edge of the separator presses and seals together the adjacent tacky edge surfaces of the separator material, resulting in a three-sided separator envelope about the battery plate.

4 Claims, 10 Drawing Figures

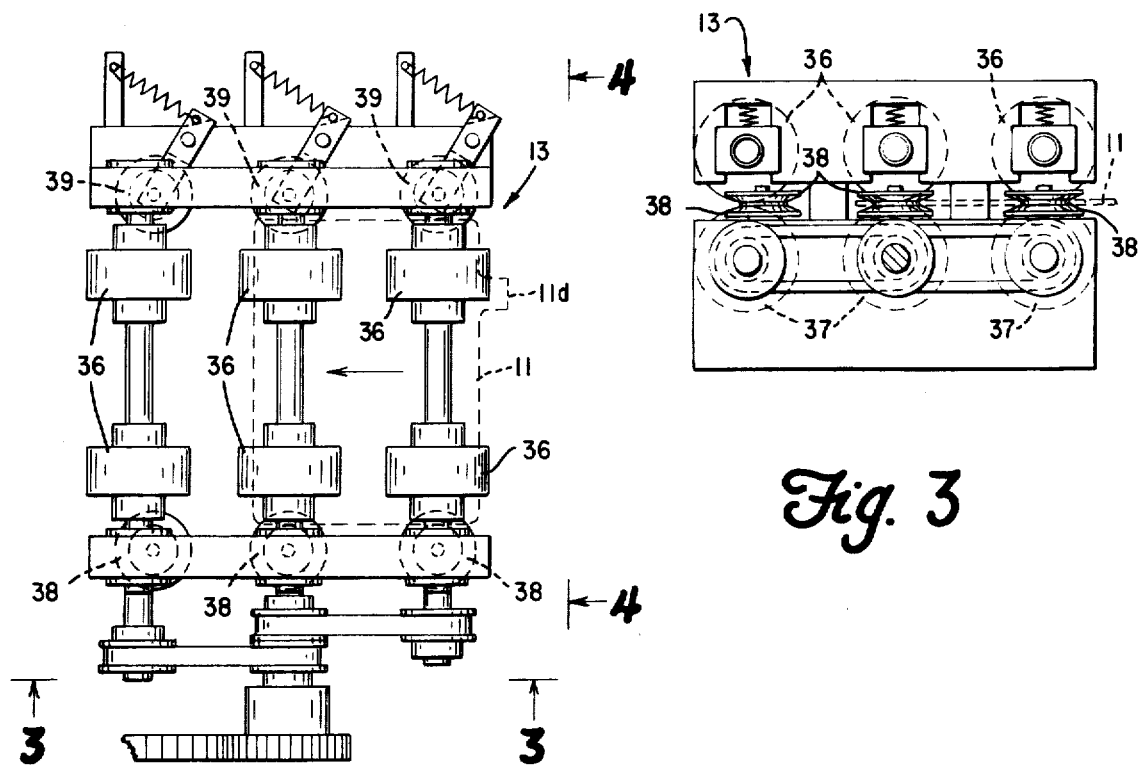
Fig. 2
Fig. 3
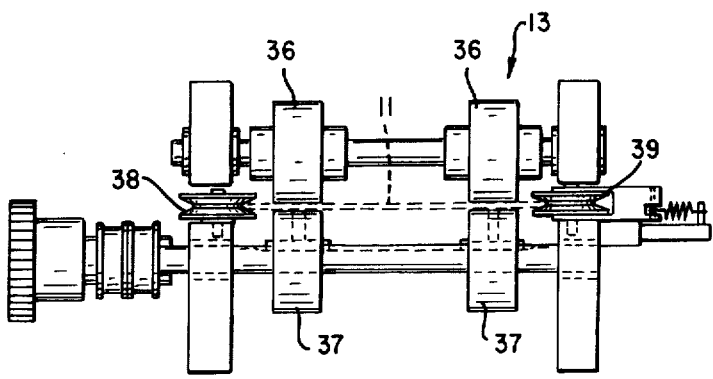
Fig. 4

BATTERY SEPARATOR ASSEMBLY MACHINE

BACKGROUND OF THE INVENTION

The invention relates to lead-acid battery assembly, and more particularly to a method and apparatus for assembling plate separators about lead plates to be assembled into such batteries.

In a lead-acid battery, each cell contains a plurality of alternate positive and negative plates. These alternate plates must be insulated from one another and yet the liquid battery acid solution must be allowed access to the surfaces of each plate. To provide the required insulation, a sheet of liquid permeable separator material of paper or polypropylene, for example, is usually inserted between the surfaces of adjacent positive and negative plates. The separator material is generally quite porous and may include ridges along its surfaces to allow the battery acid free access to the plate surfaces. Thermoplastic porous materials such as melt blown polypropylene or polyethylene have been successfully made with a controlled porosity and thickness which readily adapts them for this use as a separator material.

Rather than using individual sheets of separator material between each pair of adjacent positive and negative plates, some battery assemblies employ a folded sheet of separator material or separator "envelope" about each of either positive or negative battery plates or both. This tends to simplify assembly while still providing the required insulation between all adjacent positive and negative plates. Folded or envelope-type separators have the additional advantage in that they protect the enclosed plate during assembly and also will retain any loose fragments of the active material (paste) which may become dislodged or loose during manufacture or subsequent use. The manner in which these folded separators or separator envelopes are applied to a group of battery plates varies with different assembly operations. Generally, however, there are some hand operations in the separator application process and in some cases the whole operation is accomplished by hand with the aid of light hand-operable machinery.

SUMMARY OF THE INVENTION

The present invention provides a fast, simple and efficient apparatus and method for applying folded or envelope-type battery separators to battery plates. None of the steps need be done by hand, nor is a great deal of equipment needed for mass production since the apparatus produces assembled battery separators and plates at such a rapid rate.

According to the method and apparatus of the present invention for assembling envelope-type battery separators onto battery plates, battery plates are first fed into a continuously moving line of conveyors with their connecting lugs oriented as the trailing edge of the plate. The loading of the battery plates may be done by hand or by other transfer apparatus known in the art, an upstream portion of which may include that apparatus disclosed in U.S. Pat. No. 3,741,365.

As each battery plate or grid is conveyed forward horizontally by rollers engaging the plate from above and below, opposed fixed and spring-loaded horizontal rollers engage the opposed lateral edges of the plate to bring the plate into a desired alignment. Disposed directly at the end of this run of driving and aligning rollers is a positioning device retaining a cut piece of battery separator material in a vertical position. The length of the battery separator sheet is somewhat more than twice the height of the battery plate and its width is somewhat wider than that of the battery plate. The sheet is preferably cut from a continuous roll of thermoplastic battery separator material which is fed downwardly into the vertical separator guides, severed by a cutter above the guides, and then supported at its bottom edge by a horizontal support tray. The cut strip of separator material momentarily remains supported with its vertical center at the level of the roller mechanism directly upstream from which the battery plate is being fed. The separator guides which hold the separator sheet in vertical position are discontinuous near the center of the separator sheet so that as the horizontally advancing battery plate is fed by the drive rollers against the middle of the separator sheet, the sheet is drawn out of the guides and automatically folded along its horizontal center line by the leading edge of the battery plate. As the plate continues advancing and drawing the two ends of the separator sheet out of the guides, the leading edge of the plate and separator is driven into tne nip of upper and lower opposed pairs of advancing conveyor belts, which grab the enveloped plate somewhat inside its lateral edges. The belts grasp the battery plate and separator and continue to convey them in horizontal position away from the separator feeding assembly.

In the case of thermoplastic separator sheets, the folded separator sheet is next heated at its lateral edges by combustion heaters positioned along the sides of the advancing conveyor. The heaters each include a line of nozzles which expel hot air and combustion gases at considerable velocity inwardly against the edges of the folded separator sheet. At each lateral edge of the separator, the two adjacent edges, which somewhat overlap the narrower battery plate, tend to open up under the influence of the gas stream so that the inside edges of each side of the folded separator sheet are heated. The separator material, being thermoplastic, attains a tacky surface condition on the opposite faces of each flap along the lateral edge thereof.

Downstream of the heaters along the plate and separator conveyor line are pairs of upper and lower highly-resilient sealing rollers for pressing together the tacky separator edges. Each pair of soft elastic rollers engage a battery plate edge and the overlapping adjacent tacky separator edges, applying pressure as the plate and separator edges are rolled through.

As the assembled plate and separator envelope leave the belt conveyor, they are ejected from between the two pairs of belts and collected in a stacking mechanism or otherwise removed.

In the case of assembly of non-thermoplastic separator materials such as paper, a pressure-sensitive adhesive would be applied to the lateral adjacent edges of the folded separator in the place of the heating station, with previous and subsequent operations being essentially the same.

BRIEF DESCRIPTION OF THE DRAWINGS

FIG. 2 is a plan view of a battery plate conveying and aligning device which comprises a portion of the machine of FIG. 1;

FIG. 3 is a partially sectioned elevational view of the device of FIG. 2, taken along the line 3—3 of FIG. 2;

FIG. 4 is an elevational view taken along the line 4—4 of FIG. 2;

DESCRIPTION OF THE PREFERRED EMBODIMENT

Figure 1:
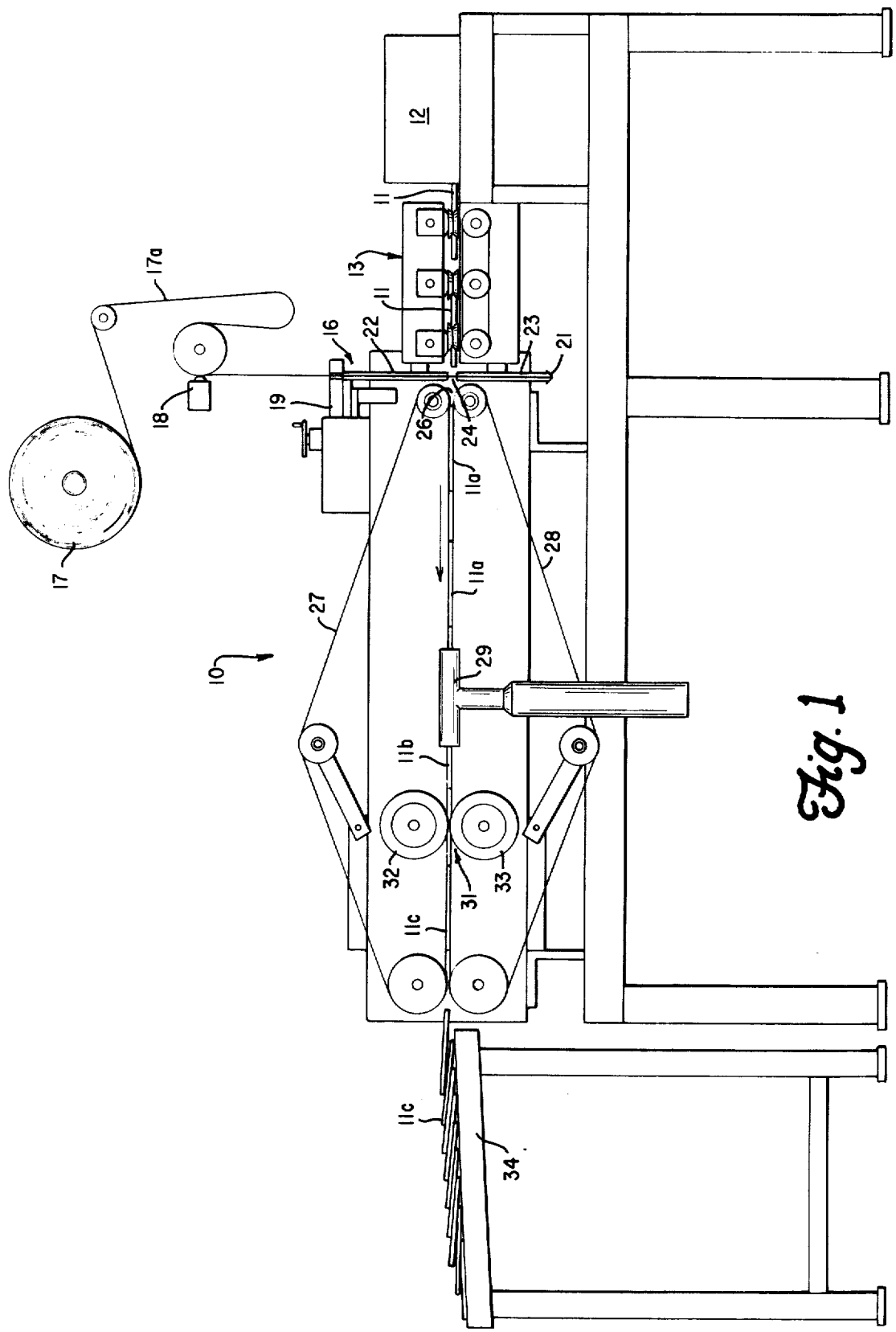
FIG. 1 is a schematic elevational view of a battery separator assembly machine according to the invention.

FIG. 1 indicates somewhat schematically a battery separator assembly machine according to the invention generally indicated by the reference number 10. Battery plates or grids 11 are fed into the apparatus 10 by a loading apparatus 12, which is shown in FIG. 1 as a box representing any suitable plate loading means, either a mechanical or hand operation. The battery plates 11 are loaded into a roller conveyor and aligner 13 which will later be described in more detail with reference to FIGS. 2, 3 and 4. As seen, for example in FIG. 6, each plate is generally rectangular and has a connecting lug or protuberance on the upper side. The plates are loaded such that the upper side with the lug is the trailing edge. The conveyor and aligner 13 moves each plate 11 in a continuous horizontal path and establishes the proper alignment for cooperation with a separator feeding assembly 16 just downstream.

As previously mentioned, a device of the type shown in the aforementioned U.S. Pat. No. 3,741,365 may be used to feed plates to the apparatus of this invention. That device feeds seriatim, in horizontal position, double units of battery plates which have been cast in pairs with their bottom edges joined and with the connecting lug on each plate extending laterally outwardly away from the paired plate. In this position the paired plates are severed at the joined bottoms and are then overturned so that the bottom edges are placed outwardly away from the opposite plate. In this position, one group of plates can be fed to the conveyor and aligner 13 as described above and the other group can be fed to a duplicate assembly machine or can be reversed in direction and alternately fed to the same assembly machine.

The separator feeding assembly 16, which will later be described in more detail in reference to FIGS. 5 and 6, includes a roll of separator material 17 from which a separator band 17a extends, a metering device 18, a cutter 19, a support tray 21 for cut sheets of separator material and upper and lower sets of separator sheet guides 22 and 23. The continuously moving battery plates 11 are driven through a gap 24 between the upper and lower separator guides, thereby picking up and folding over the plate 11 a cut sheet of separator material, as the plates 11 continue to move into the nip 26 of two pairs of opposed cooperating conveyor belts 27 and 28. This conveying apparatus will be more particularly described in reference to FIGS. 5, 7 and 8.

Again referring to FIG. 1, the advancing battery plate and folded separator assemblies 11a continue to move along the conveyor belts 27 and 28 with the lateral edges of the folded separator material open and overhanging the lateral edges of the plates 11. In this position the plates and separators 11a are moved past a pair of combustion heaters 29, one on either side for each lateral separator edge. The heaters 29, which cause the lateral edge surfaces of the thermoplastic separator material to become tacky, will be described in more detail in reference to FIGS. 8 and 9.

The tacky-edged separator and plate assemblies 11b continue to move downstream with the conveyor belts 27 and 28 to a pressing apparatus 31 which comprises upper and lower pairs of rollers 32 and 33. The details of the pressing apparatus 31 will be described in reference to FIGS. 7 and 10.

The completed battery separator and plate assemblies 11c are then ejected from the downstream end of the conveyor belts 27 and 28. At this point, they may be stacked in a receiving area 34 or removed by any suitable means.

The battery plate conveyor and aligner 13 is shown in detail in FIGS. 2, 3 and 4. The battery plate 11 having a connecting lug 11d oriented upstream is received between pairs of idling rollers and driven rollers 36 and 37 above and below the plate, respectively, as best seen in FIG. 4. As shown in FIG. 3, the idling rollers 36 are spring-biased downward so that each plate 11 is positively engaged between the idling rollers 36 and the driven rollers 37. The plate 11 then continues to be driven by further sets of rollers 36 and 37 as shown in FIGS. 2 and 3. Fixed rotatable horizontal guide pulleys 38 establish the position and alignment of the left side of the plate 11, while spring-loaded pivotally mounted guide pulleys 39 on the right side of the plate 11 urge the plate into the desired position against the opposed pulleys 38. Thus, the plates 11 are continuously driven along a straight path with their lateral edges properly aligned.

Figure 5:
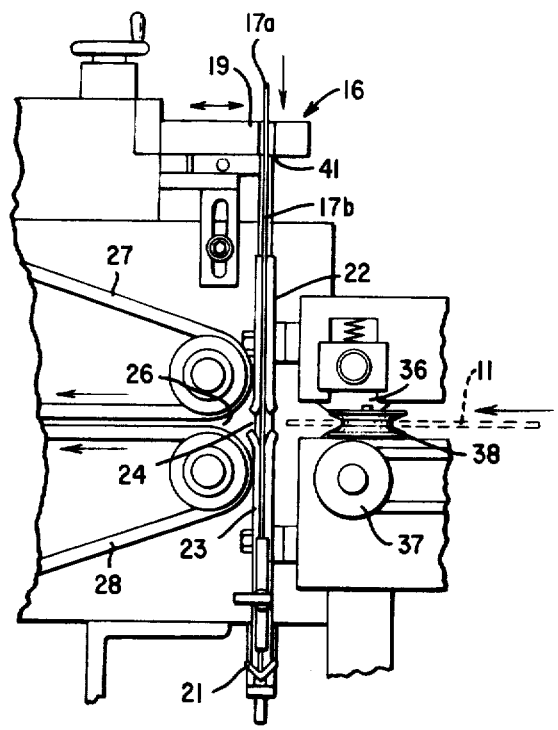
FIG. 5 is an elevational view of a battery separator folding and conveying apparatus included in the machine of FIG. 1.
Figure 6:
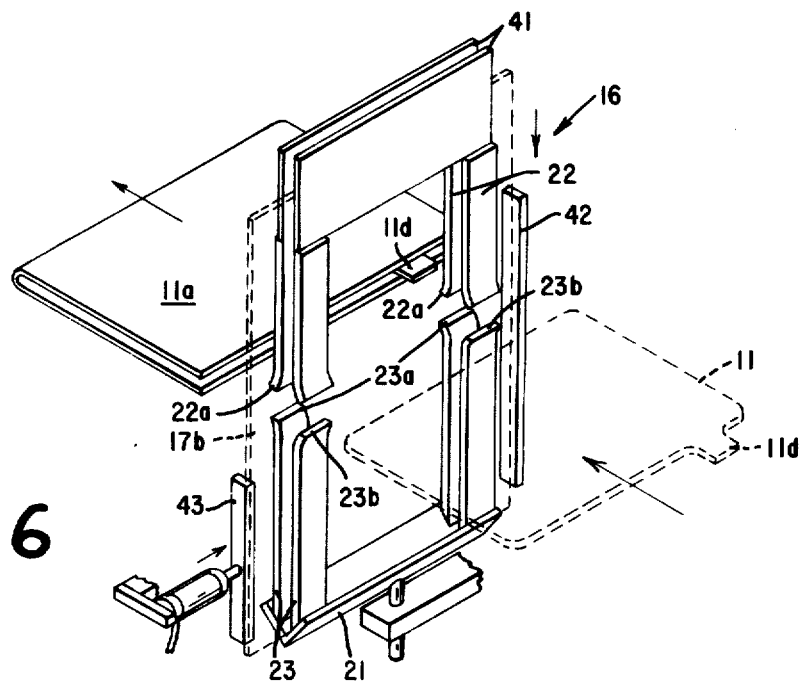
FIG. 6 is a schematic perspective view of the device of FIG. 5.

FIGS. 5 and 6 show the structure and manner of operation of the separator feeding assembly 16. A band of separator material stock 17a, somewhat wider than the battery plates 11, is fed downwardly through the cutter 19 and through shearing edges 41 into the sets of upper and lower separator guides 22 and 23, which loosely retain the separator band in a vertical position. As a battery plate 11 approaches the gap 24 between the guides 22 and 23, the cutter 19 shears off the separator band 17a in guillotine fashion, dropping a separator sheet 17b a short distance to rest with its bottom edge on the support tray 21. The length of the sheet 17b has been properly metered by the metering device 18 of FIG. 1 to place the center of the sheet within the gap 24 and directly within the path of the horizontally advancing battery plates 11. The metering device 18 and the support tray 21 are adjustable to accommodate different battery plate heights, the sheet 17b being about twice the length of the battery plate height.

The cut separator sheet 17b is laterally centered for alignment with the plate 11 by a device shown in FIG. 6. A vertical stop member 42 on the right side of the sheet 17b establishes the correct lateral position for the sheet 17b, which is pushed thereagainst immediately after cutting by a small hydraulic or pneumatically-operated pusher 43. The pusher 43 retracts after it has positioned the separator sheet 17b. For different battery plate widths a wider roll of separator material 17 can be substituted and the stop 42 and pusher 43 can be adjusted accordingly.

As FIGS. 5 and 6 indicate, the advancing battery plate 11 is pushed into the center of the separator sheet 17b, causing the sheet to fold about the plate 11 as the plate advances forward and draws the sheet 17b out of the guides 22 and 23. To aid this folding process and to prevent cutting and/or creasing of the separator sheet 17b, the separator guides 22 and 23 have flared forward edges 22a and 23a. The rearward edges 23b of the lower guides 23 may also be flared to aid in guiding the descending band of separator material 17a.

As the battery plate 11, continuing its forward movement under the influence of the rollers 36 and 37, continues to draw forward the now folded sheet of battery separator material 17b, it is engaged in the nip 26 of the roller-driven belts 27 and 28, as best seen in FIG. 5. The belts 27 and 28 thus draw the battery plate and folded separator assembly 11a away from the separator feeding assembly 16 so that the band of separator material 17a can again be advanced downward and a newly cut sheet 17b can be dropped into position.

Figure 7:
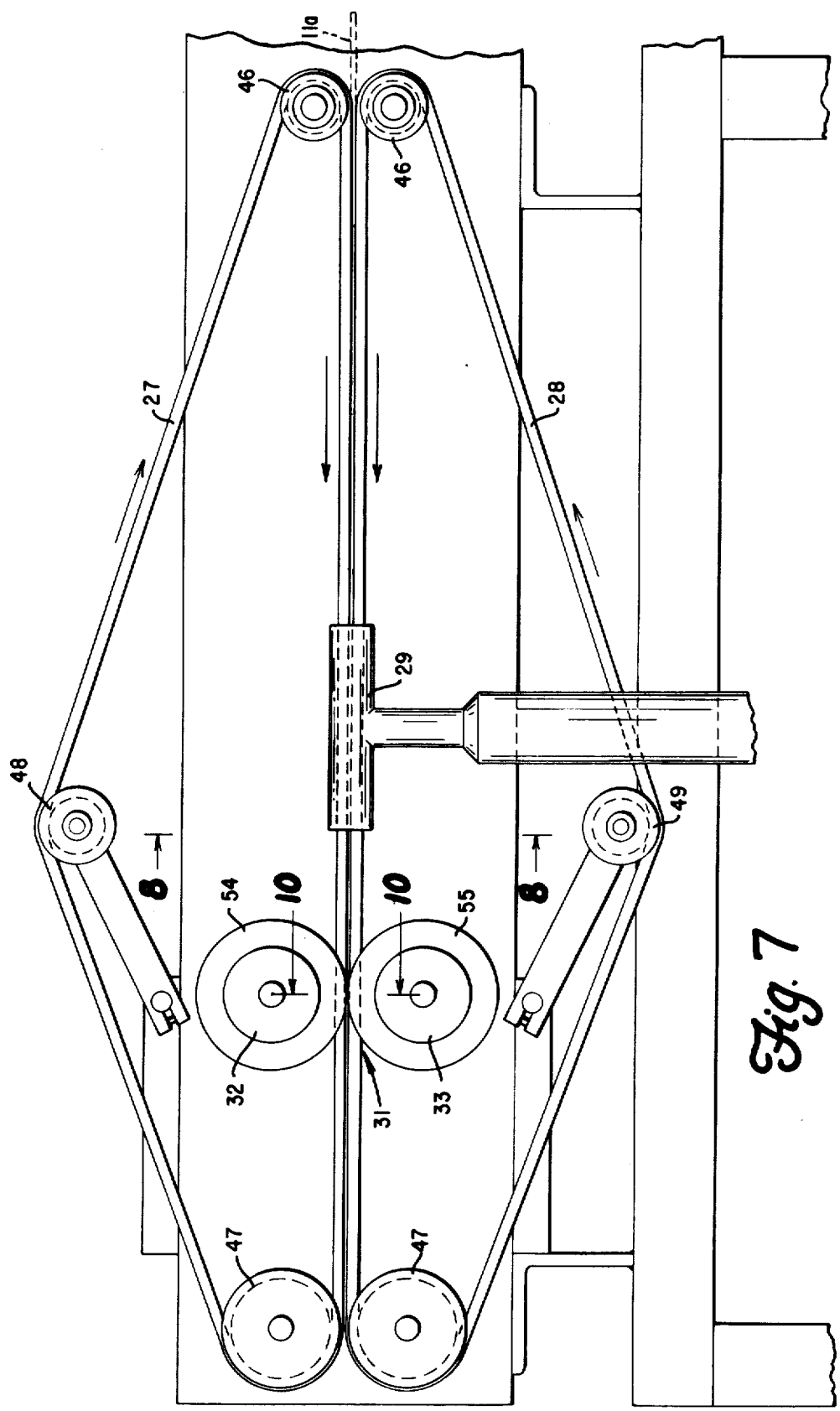
FIG. 7 is an elevational view of a conveying, heating and pressing portion of the machine of FIG. 1.
Figure 8:
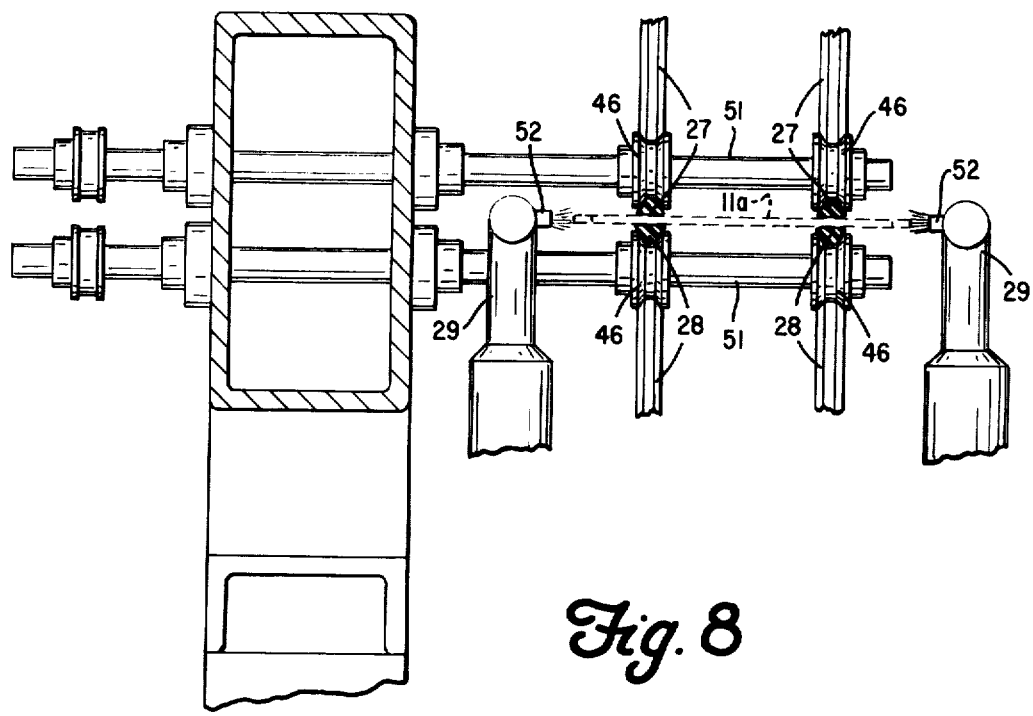
FIG. 8 is a sectional view taken along the line 8—8 of FIG. 7.

The belt conveyor apparatus is best viewed in FIGS. 7 and 8. Pulleys 46 and 47 retain and guide the two upper belts 27 and the two lower belts 28, which are preferably V-belts. The upper and lower belts may be driven by either the pulleys 46 or the pulleys 47. Adjustable idler pulleys 48 and 49 are provided to maintain the desired degree of tension in the belts 27 and 28. FIG. 8 indicates the pulleys 46 as the drive pulleys, with drive shafts 51 connected to the upper and lower pulleys 46. As FIG. 8 indicates, the pulleys 46 and belts 27 and 28 (as well as the pulleys 47) are spaced apart somewhat less than the width of the battery plate and separator assembly 11a. When the plates and separators 11a are fed into the belts 27 and 28, they are approximately centered therein so that roughly equal portions of the assemblies 11a extend laterally outward from the conveyor system. This allows the heating and pressing operations to be performed on the separator edges, as will be described below.

Figure 9:
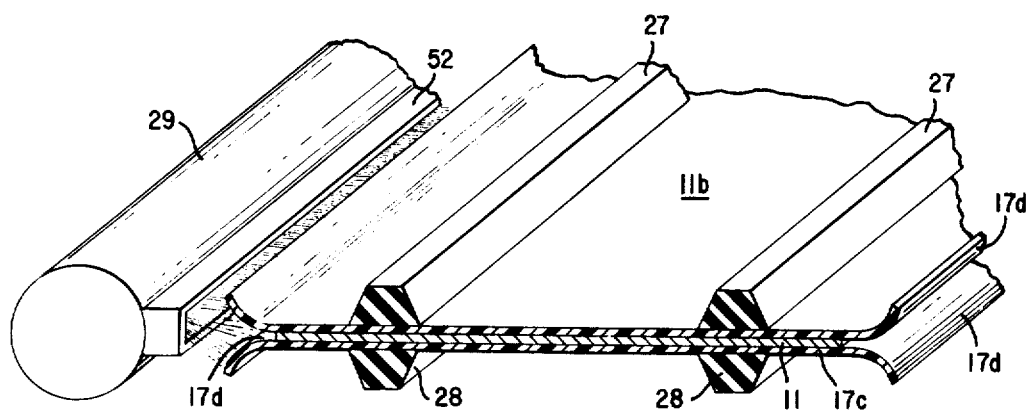
FIG. 9 is a schematic perspective view showing the operation of the heating apparatus of FIGS. 7 and 8.

The separator edge heaters 29 are shown in FIGS. 8 and 9. The folded envelope of separator material 17c comprises, or may be coated with, on its inside edge surfaces 17d, a material which becomes tacky upon application of heat. Thus, the heaters 29 are positioned along the sides of the plate and separator assemblies 11a in their path with the belt conveyors 27 and 28 in order to produce the required separator edge tackiness for bonding the edges together. Other types of heat may be employed, such as hot contact or radiant heat, but hot air or combustion heaters are preferred because of their ability to open the separator edges and apply heat directly thereto, as indicated in FIG. 9. The combustion heaters 29 expel air and products of combustion out longitudinally oriented nozzles 52. As indicated in FIGS. 7 and 9, the nozzles 52 are of very small height but substantial length to provide for the proper heating of the separator edge surfaces 17d. The heaters may be operated continuously or intermittently in timing with the passing plate assemblies 11a.

Figure 10:
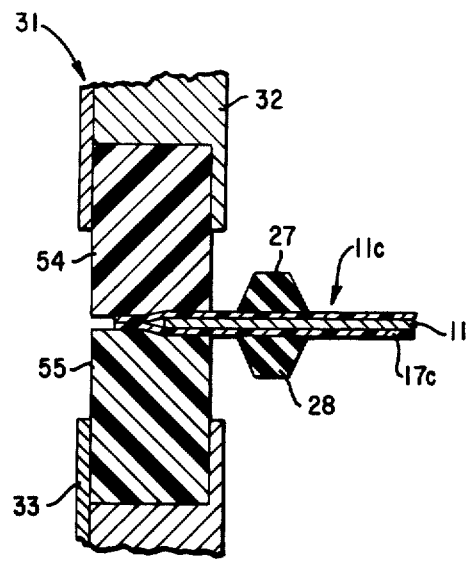
FIG. 10 is an enlarged schematic sectional view taken along the line 10—10 of FIG. 7.

FIG. 10 is an enlarged cross section showing a portion of the pressing apparatus 31 of FIGS. 1 and 7. The pressing rollers 32 and 33 include circumferentially mounted soft elastic upper and lower pressing rollers 54 and 55. When the battery plate and separator assembly 11b with its tacky lateral edge surfaces is brought by the belt conveyors 27 and 28 through the pressing rollers 32 and 33, the soft pressing shoes 54 and 55 engage the folded separator 17c at its outer edge and also somewhat inward over the area within which the battery plate 11 resides, sealing the edges to form a completed assembly 11c. This arrangement allows for adequate pressing and sealing of the separator edges without need for precise lateral positioning of the plate and separator with respect to the pressing rollers 32 and 33.

Following the edge sealing of the battery separators, the completed battery plate and separator assemblies 11c emerge from the belt conveyors 27 and 28 as enveloped battery plates with only the top of the separator envelope open. The bottom and sides of the envelope are closed by the separator fold and by the sealed lateral edges, respectively. The plate connecting lug 11d extends out the open top of the separator envelope. When the enveloped plates 11c are assembled in a battery cell alternately with uncovered plates of opposite charge, all adjacent plates are thus insulated from one another.

The above-described preferred embodiment provides a battery separator assembly machine which envelopes battery plates within separator material with a minimal expenditure of time and cost. As previously mentioned, while the above-described embodiment is designed for use in assembling separator envelopes made of a thermoplastic material or having a coating of such material on the adjacent lateral edges, certain principals of the invention can be used with non-thermoplastic materials. Such a modification would include an applicator for a pressure-sensitive adhesive in place of the heating device, with the remaining parts of the assembly machine and method being substantially unchanged.

Various other embodiments and alterations to this preferred embodiment will be apparent to those skilled in the art and may be made without departing from the spirit and scope of the following claims.

We claim:

1. A method of assembling battery plates and plate separators comprising the steps of moving a flexible generally planar separator sheet between opposed and spaced apart separator guides, retaining said separator sheet loosely between said guides in generally unrestrained condition and supported in a holding position, moving a battery plate in a direction substantially normal to said planar sheet toward such holding position to intersect said separator sheet at the midpoint thereof with the leading edge of said battery plate, continuing movement of said battery plate through said holding position to draw such unrestrained flexible sheet from between said separator guides thereby folding said separator sheet over said battery plate, and thereafter adhering adjacent surfaces of said folded sheet to one another, thereby forming a battery plate covered by an envelope formed by said folded separator sheet.

2. The method of claim 1 wherein said adhering step comprises heating the adjacent surfaces of the separator edges to a tacky condition by directing a hot gas stream toward and between the separator edges to spread the edges apart, thereby heating the inside surfaces thereof, and pressing together the resulting tacky surfaces.

3. A battery separator assembly machine, comprising:
means for sequentially feeding sheets of battery separator material into a loose holding position, each sheet including a heat-sensitive adhesive along its lateral edges;
means for continuously conveying battery plates, in a path parallel to the plane of the plates, through and beyond said holding position;
means for folding and directing each sheet of battery separator material over an advancing battery plate to substantially cover the battery plate and form overhanging lateral separator edges at lateral plate edges;

hot gas heating means downstream of said holding position including nozzles positioned toward the lateral separator edges as the separators and battery plates are advanced by the conveying means, said nozzles being operable to direct a hot gas stream into and spread the lateral separator edges, thereby heating the inside surfaces thereof and creating a tacky condition; and means for pressing together the adjacent tacky surfaces of the separator to form an envelope about the battery plate.

4. The apparatus of claim 3 wherein said pressing means comprises pairs of opposed cooperating counter-rotational rollers disposed in the path of the lateral separator edges adjacent the conveying means, said rollers being soft and yieldable and positioned to overlap the overhanging lateral separator edges in both directions.

* * * * *